United States Patent Office 2,857,311
Patented Oct. 21, 1958

2,857,311

DERMATOLOGICAL MIXTURE OF ION-EXCHANGE RESINS

Francis M. Thurmon, Boston, Mass., and Robert Kunin, Trenton, N. J., assignors to Rohm & Haas Company, Philadelphia, Pa., a corporation of Delaware No Drawing. Application July 6, 1954
Serial No. 441,638

7 Claims. (Cl. 167—58)

This invention deals with a mixture of ion-exchange resins for dermatological applications. It concerns dusting powders, lotions, and ointments which contain as the primary active agent an intimate mixture of three kinds of ion-exchange resins in finely divided form. This mixture possesses valuable therapeutic properties and is effectively applied to external body surfaces for preventing, correcting, or overcoming venenation caused by the active principles from such botanical sources as poison ivy or poison oak.

In our copending application, Serial No. 187,357, filed September 28, 1950, now U. S. Pat. No. 2,684,321, issued July 20, 1954, we have described a skin-treating mixture of ion-exchange resins of four kinds—sulfonated ion-exchange products in hydrogen form, quaternary ammonium exchangers in hydroxyl form, carboxylic resin exchangers in hydrogen form, and amino anion-exchange resins in basic form. Since ion-exchange materials are insoluble, it becomes possible to mix particles of what in effect is a strong acid with particles of an insoluble strong base and have available for reaction both strong acid and strong base. It was found necessary, however, to provide a buffering effect. This was done by admixing particles of both a weak acid exchanger and a weak base exchanger. The resulting four component mixture has been proved remarkably effective for taking up toxic agents of many types.

It has been noted, however, that in some instances this mixture is too stimulating. Also, it has been found that the mixture of the above four components reacts neutral even with extremely wide variations in proportions of components. It appears more desirable to use preparations which are mildly acidic, since the normal skin surface is acidic. Both of these difficulties are corrected by our present invention.

We have found that an intimate mixture of fine particles of a sulfonated ion-exchange material in hydrogen form, a carboxylic cation-exchange resin in hydrogen form, and an anion-exchange resin of intermediate base strength provides a useful agent for dermatological use. It can adsorb or absorb toxic agents and reaction products and restore skin surfaces to a mildly acidic state, thus permitting healing and normal growth to proceed without irritation or excess stimulation.

As the strongly acidic portion of the resin mixture, there is used at least one sulfonated ion-exchange material in hydrogen form. These sulfonated materials are insoluble products which are known and which exchange hydrogen for metal ions in salt solutions, thus being capable of lowering the pH of solution of salts to low values. For example, a tenth normal solution of sodium or potassium chloride when brought in contact with a sulfonated ion-exchanger gives a pH below two. The exchanger may be an insoluble condensate of phenol and formaldehyde having methylene sulfonic groups. There may also be used sulfonated cross-linked polymers from styrene, these usually being cross-linked with polyvinylbenzene and containing sulfonic groups in nuclear positions. Less attractive, but still effective are the "carbonaceous zeolites" prepared by sulfonation or sulfonation and oxidation of coals and lignites. The above are typical of the class of strongly acidic sulfonated cation-exchange resins which give a high degree of acidity to dilute salt solutions because they are capable of splitting salts, exchanging their hydrogen ions for metal ions. The presently known sulfonated exchangers impart a pH between 1.1 and 2.5 to a physiologically normal salt solution.

The carboxylic cation-exchange resins which enter into the mixture of this invention are insoluble polymeric substances which contain the —COOH group as the functional group thereof. These resins are obtained from acids (or their anhydrides) having an unsaturated linkage which permits their entering into copolymers with polymerizable substances including at least one which causes cross-linking. For example, as is known, maleic anhydride and styrene can be polymerized together and when there is also present an unsaturated compound having at least two non-conjugated double bonds, an insoluble resin results. The cross-linking agent may be one such as divinylbenzene, trivinylbenzene, ethylene diacrylate, ethylene dimethacrylate, divinyl ether, diallyl maleate, fumarate, or itaconate, or diallyl phthalate. Another source of carboxylic exchangers is based on copolymerization of acrylic or methacrylic acid and a polyunsaturated polymerizable compound, such as above noted, with or without another polymerizable ethylenically unsaturated compound, such as ethyl acrylate, methyl methacrylate, butyl methacrylate, or dimethyl itaconate. The copolymers are formed in the conventional way with the aid of a polymerization initiator, such as benzoyl peroxide, lauroyl peroxide, tert-butyl perbenzoate, tert-butyl hydroperoxide, or cumene hydroperoxide. The carboxylic resins are rendered free of monomeric materials, inhibitor, and initiator, as by distilling off material under reduced pressure or with steam, extracting, saturating with an aqueous metal salt solution followed by regenerating, and washing thoroughly with water. But the degree of purification need not be so exact or complete for use in mixtures of this invention as when the carboxylic resinous exchangers are used as the sole exchange agent in therapeutic preparations. For purposes of this invention, the exact degree of acidity of the carboxylic resins is not critical. There may be used carboxylic resins which give a pH of about 2.5 to above 5 in physiologically normal salt solutions.

The anion-exchange resins of intermediate basicity are those which impart to an aqueous 0.15 N solution of sodium or potassium chloride a pH between 9.8 and 11. It may be noted that quaternary ammonium resins in basic form give pH's above 12, while the usual weak base exchangers, such as insoluble condensates of phenols, formaldehyde, and polyalkylene polyamines, give pH's of about 8 to 8.5 under the prescribed conditions.

Particularly useful anion-exchange resins of intermediate basicity are prepared by the aminolysis of cross-linked polymers of lower alkyl acrylates and methacrylates with a polyamine having at least one primary amino group, the polyamine being used in molecular excess. Details of preparing these resins are presented in U. S. Patent No. 2,675,359.

Other resins of intermediate basicity are those formed by aminolysis of copolymers of maleic, fumaric, or itaconic acids, or their esters with other polymerizable ethylenically unsaturated compounds, including cross-linking polyunsaturated compounds. Thus, copolymer of dimethyl fumarate, styrene, and the divinyl ether of ethylene glycol are heated with polyethylenepolyamines to give useful anion-exchange resins.

Other anion-exchange resins of intermediate basicity are those formed by reaction of phenol-formaldehyde-polyalkylenepolyamine resins with epichlorohydrin, to eliminate acidic phenolic groups and thereby raising the basicity of the resin.

The proportions of the three kinds of resins will vary with the particular sulfonic, carboxylic, and amino resins selected since there is a variation in the pH effects of these materials and their capacities, and in accordance with the desired range of pH to be imparted by the mixture. It is desired to use mixtures which will provide in the prescribed test conditions a pH from about 5 up to 7. In some unusual cases, a pH below 5 may be desired and this is attainable with the mixture here described through choice of exchangers and their proportions.

Generally there are used by weight 5 to 40 parts of an acidic sulfonated cation-exchange material (I), 20 to 55 parts of a carboxylic cation-exchange resin (II) and 30 to 60 parts of an anion-exchange resin of intermediate base strength (III), the total parts making 100. Some typical compositions of mixtures which are suitable for the practice of this invention have been prepared in the following proportions, the Roman numerals indicate the above types of resins: I 40, II 20, and III 40 to give a pH of 6; I 5, II 39, III 56 to give a pH of 7; I 35, II 35, III 30 to give a pH of 6.1; and I 10, II 50, III 40 to give a pH of 5.3, in these cases the sulfonic acid resin being a styrene-divinylbenzene copolymer, the carboxylic resin being a copolymer of acrylic acid and divinylbenzene, and the basis resin being an amino resin formed by aminolysis of methyl acrylate-divinylbenzene copolymer with diethylenetriamine.

With a sulfonated phenol-formaldehyde exchange resin in place of the above sulfonic acid resin a small increase in its proportion is needed to maintain the desired pH of the mixture. For example, 40 parts of a sulfonated phenol-formaldehyde resin, 33 parts of a carboxylic resin, and 27 parts of the above anion-exchanger gave a pH of 5.9. In all cases it has been found possible to adjust the proportions of the three kinds of resins to give a mixture with the desired range of pH.

The resins to be mixed or the mixture of resins are prepared as fine powders. The resin particles are less than 100 mesh and it is best that the bulk of the powdered resin pass a 325 mesh screen.

The mixture of the three kinds of resins can be made into a dusting powder by mixing the three kinds of resins with finely divided solid extenders, or into a lotion, paste, or ointment by dispersing or suspending the resins in a hydrophilic liquid, hydrophilic ointment base, or, if the resins are in hydrated form, salve.

Dilution of the three kinds of resins with finely divided solid yields a dusting powder. As solid there may be used finely particled talc, clay, starch, zinc stearate, or mixtures of such solid carriers or extenders. Useful powders may contain 10% to 80% of the mixed resins and the balance to make 100% is a powder base. Such a base may be prepared from 0% to 20% of a fine clay, 0% to 10% of zinc stearate, and talc up to 95%. The powders may be modified by absorbing therein a small amount of a humectant or wetting agent.

A highly advantageous preparation for applying the mixture of resins of this invention comprises lotions or suspensions of the mixture of finely particled resins in a liquid medium which is hydrophilic in nature. Such a composition can be applied by pouring, gently patting, or smearing onto surfaces to be treated even though such surfaces are inflamed. A convenient liquid medium is aqueous glycerin. There may also be used viscous aqueous solutions of gums or gum-like products. For example, there may be used solutions of tragacanth, Karaya, quince seed gum, pectin, Irish moss, alginates, cellulose ethers, or polyethylene glycols, or mixtures of these. The vehicle may also comprise an emulsion of an oil or wax in an aqueous vehicle.

As the concentration of thickener increases, the vehicle becomes a cream, an ointment, or a paste. Ointment bases may be used which include aqueous dispersions of waxes, cetyl alcohol, spermaceti, lanolin, petrolatum, oils, stearic acid, an dso on, together with an acceptable emulsifier, such as an ethanolamine soap, glyceryl monolaurate, glycol monolaurate, glyceryl monostearate, long chained sulfates or sulfonates, non-ionic emulsifiers having polyethoxy units, and quaternary ammonium salts. For most applications a hydrophilic base is preferred. If a hydrophobic base is to be used, the mixture of finely particled resins must be hydrated before being mixed therewith. When hydrophilic base is used, the mixture may also be hydrated before compounding. If desired, it may be hydrated or or solvated by the hydrophilic base.

Hydrophilic bases include those prepared from bentonites which swell in water and form aqueous gels, gums which swell in water, water-dispersible cellulose ethers, pectins, waxy polyethylene glycols, and the like. Useful hydrophobic bases are also known, typical of which are oils thickened with water emulsified therein and oils thickened with inert polymers such as oil-soluble viscous polymers from acrylic and methacrylic acid such as the copolymer from butyl and stearyl methacrylates, or polyethylene, dispersions of which can be made in mineral or glyceride oils.

Lotions, ointments, or salves may contain from about 5% to about 50% of the mixture of this invention. The upper limit is determined only by the physical nature of the mixture, which must remain sufficiently liquid or unctuous to permit ready application.

In the following illustrative examples details of typical preparations and typical applications are described.

*Example 1*

There are mixed in finely divided form 35 parts by weight of an insoluble resin having sulfonic acid groups, said resin being a cross-linked copolymer from styrene and divinylbenzene, having a capacity of 4.5 m. e. per gram of dry resin, 35 parts of cation-exchange resin prepared from methacrylic acid and divinylbenzene (95:5) by copolymerization, having a capacity of 10.5 m. e. per gram of dry resin, and 30 parts of a basic resin prepared by copolymerizing methyl acrylate with 2% of divinylbenzene, reacting this copolymer with excess of diethylenetriamine up to 200° C., and washing out all soluble material. This basic resin gives a pH, when one gram of the resin is suspended in 25 ml. of an aqueous 0.15 N sodium chloride solution, of about 10.5 and has a capacity of 8.7 m. e. per gram of dry resin. The resulting mixture is wet with water, drained, and mixed with aqueous 66% glycerine to form a lotion about 50 parts of the moist mixture being incorporated with 100 parts of the 66% glycerine, the parts being by weight. This preparation has a pH of about 6.

Similar lotions are readily prepared by mixing 10 parts of the moist mixture and 90 parts of 66% glycerine or 15 parts of mixture and 85 parts of the glycerine. All of these lotions are effective in counteracting the effects of poison ivy.

*Example 2*

A mixture is prepared from 80 parts of a phenol-formaldehyde resin having methylene sulfonic groups, 65 parts of a carboxylic cation-exchanger in hydrogen form, prepared from copolymerization of acrylic acid and ethylene dimethacrylate (capacity 12 m. e. per gram), and 55 parts of a basic resin prepared by the aminolysis of a copolymer of methyl methacrylate and divinylbenzene with triethylenetetramine in excess at 170–180° C., this resin giving a pH of 10.1. The resin mixture is ground to pass 90% through a 325 mesh sieve and rinsed with water. There are mixed 25 parts of this mixture with 75 parts of an ointment base which is prepared from glyceryl monolaurate-stearate, 15 parts, spermaceti, 5 parts, ethoxyethanol, 5 parts, water, 75 parts, and a preservative. The consistency may be adjusted with water. The resulting ointment has a pH of about 6 and is effective for controlling and overcoming dermatoses caused by *Rhus toxicodendron* or *quercifolia*, and the like.

Example 3

A powder base is prepared from 80 parts of talc, 3 parts of zinc stearate, and 17 parts of kaolin. There are mixed 40 parts of a sulfonated styrene-divinylbenzene copolymer cation-exchange resin in hydrogen form, 35 parts of a commercial carboxylic cation-exchange resin in hydrogen form (capacity 12.1 m. e. per gram) giving a pH of 2.5, and 25 parts of an anion-exchange resin giving a pH of 10.3, prepared from a phenol-formaldehyde-polyethylene-polyamine condensate treated with ethylene oxide without reaching the quaternary form. This mixture gives a pH of about 5.5.

Each of these resins was finely ground and the mixture sieved to remove material not passing a 250 mesh screen. There are mixed 25 parts of this mixture and 75 parts of the powder base. The resulting powder is absorbent, adhesive and soothing. It is effective as a protectant and as a healing agent against botanical venenation.

We claim:

1. A topical dermatological therapeutic composition comprising a mixture of ion-exchange resins consisting of a sulfonated cation-exchanger in hydrogen form, a carboxylic cation-exchange resin in hydrogen form, and an anion-exchange resin in basic form which imparts a pH between 9.8 and 11 to an aqueous 0.15 N salt solution, said exchange materials being in finely divided state and intimately and uniformly mixed, the mixture thereof imparting a pH to a 0.15 N salt solution of about 5 to not over 7.

2. A topical dermatological therapeutic composition comprising an intimate, uniform mixture of ion-exchange resins consisting of a sulfonated cation-exchanger in hydrogen form, a carboxylic cation-exchange resin in hydrogen form, and an amino anion-exchange resin in basic form which imparts a pH between 9.8 and 11 to an aqueous 0.15 N salt solution, said exchange materials being in finely divided state, the mixture thereof imparting a pH to a 0.15 N salt solution of not over 7.

3. A topical dermatological therapeutic composition comprising in admixture 20% to 90% of a powder base and 80% to 10% of an intimate mixture of fine particles of ion-exchange resins consisting of a sulfonated cation-exchange resin in hydrogen form, a carboxylic cation-exchange resin in hydrogen form, and an anion-exchange resin in basic form which imparts a pH between 9.8 and 11 to an aqueous 0.15 N salt solution the mixture thereof imparting a pH to a 0.15 N salt solution of not over 7.

4. The composition of claim 3 in which the anion-exchange resin is a cross-linked copolymer from a lower acrylate aminolyzed with a polyethylenepolyamine.

5. A topical dermatological therapeutic composition comprising dispersed in a hydrophilic liquid a mixture of fine particles of ion-exchange resins consisting of a sulfonated cation-exchange resin in hydrogen form, a carboxylic cation-exchange resin in hydrogen form, and an anion-exchange resin in basic form which imparts a pH between 9.8 and 11 to an aqueous 0.15 N salt solution, said mixture giving a pH of not over 7.

6. The composition of claim 5 in which the liquid is aqueous glycerine and the mixture of resins comprises 5% to 50% of the composition.

7. A topical dermatological therapeutic composition comprising dispersed in an ointment base a hydrated mixture of finely divided particles of ion-exchange resins consisting of a sulfonated cation-exchange resin in hydrogen form, a carboxylic cation-exchange resin in hydrogen form, and an anion-exchange resin in basic form which imparts a pH between 9.8 and 11 to an aqueous 0.15 N salt solution, said mixture giving a pH of not over 7 and comprising 5% to 50% of the composition.

References Cited in the file of this patent

UNITED STATES PATENTS

| | | |
|---|---|---|
| 2,501,927 | Block | Mar. 28, 1950 |
| 2,684,321 | Thurmon | July 20, 1954 |